(12) United States Patent
Vial (10) Patent No.: US 8,374,732 B2
(45) Date of Patent: Feb. 12, 2013

(54) INTERACTIVE DEVICE FOR CONTROL OF UTILITY SYSTEMS IN AN AIRCRAFT

(75) Inventor: Jean-Sebastien Vial, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 534 days.

(21) Appl. No.: 12/538,532

(22) Filed: Aug. 10, 2009

(65) Prior Publication Data
US 2010/0049409 A1 Feb. 25, 2010

(30) Foreign Application Priority Data

Aug. 20, 2008 (FR) ...................................... 08 55654

(51) Int. Cl.
*G06F 7/00* (2006.01)

(52) U.S. Cl. ............................................. 701/3; 701/36

(58) Field of Classification Search ................ 701/3, 36, 701/11, 14–18, 400, 408, 431; 340/945, 340/971; 244/1 R
See application file for complete search history.

(56) References Cited

U.S. PATENT DOCUMENTS

| | | | |
|---|---|---|---|
| 5,454,074 A | | 9/1995 | Hartel et al. |
| 5,978,715 A | * | 11/1999 | Briffe et al. ...................... 701/11 |
| 6,122,572 A | * | 9/2000 | Yavnai ............................ 701/23 |
| 6,842,122 B1 | | 1/2005 | Langner et al. |
| 6,946,976 B1 | | 9/2005 | Langner et al. |
| 2007/0142980 A1 | | 6/2007 | Ausman et al. |

* cited by examiner

*Primary Examiner* — Yonel Beaulieu
(74) *Attorney, Agent, or Firm* — Oblon, Spivak, McClelland, Maier & Neustadt, L.L.P.

(57) ABSTRACT

A device for control of a plurality of support subsystems in an aircraft includes a filtering unit that determines at least one command associated with at least one support subsystem of the plurality of support subsystems according to at least one context parameter. The device also includes a display unit that displays at least one representation of the at least one determined command. The at least one representation of the at least one determined command includes an indication relating to a state of the at least one support subsystem controlled by the at least one determined command. The device further includes a selection unit that selects the at least one representation. In addition, the device includes an activation unit that transmits the at least one determined command to the at least one support subsystem in response to an activation of the at least one selected representation.

9 Claims, 7 Drawing Sheets

INTERACTIVE DEVICE FOR CONTROL OF UTILITY SYSTEMS IN AN AIRCRAFT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to the command of systems in an aircraft and more particularly to a method and an interactive device for control of support subsystems in an aircraft.

2. Description of Related Art

The electronic and networking systems installed on board an aircraft relate substantially to two distinct types of functionalities. The first type of systems, known as avionic systems, relate to assisting the aircraft crew in assuring its tasks of piloting, navigation, communication, environmental monitoring and mission management. Systems of this type relate in particular to flight control systems, the automatic pilot, communication (voice and data) and navigation (radio, inertial, autonomous) systems and environmental monitoring systems (radar, weather, ground anti-collision, traffic anti-collision). Systems of the second type relate to generation and distribution of electrical capacity, generation and distribution of hydraulic capacity, generation of pneumatic capacity, air conditioning and pressurization, fuel management and the auxiliary power engine, known collectively as aircraft support subsystems.

All of these systems are commanded via control interfaces. In general, the control interface of the avionics is disposed facing the pilot and on his sides, under the windshield, the control interface of the support subsystems being placed on the ceiling, between the pilot and the copilot, so as to be accessible to each.

Figure 1:
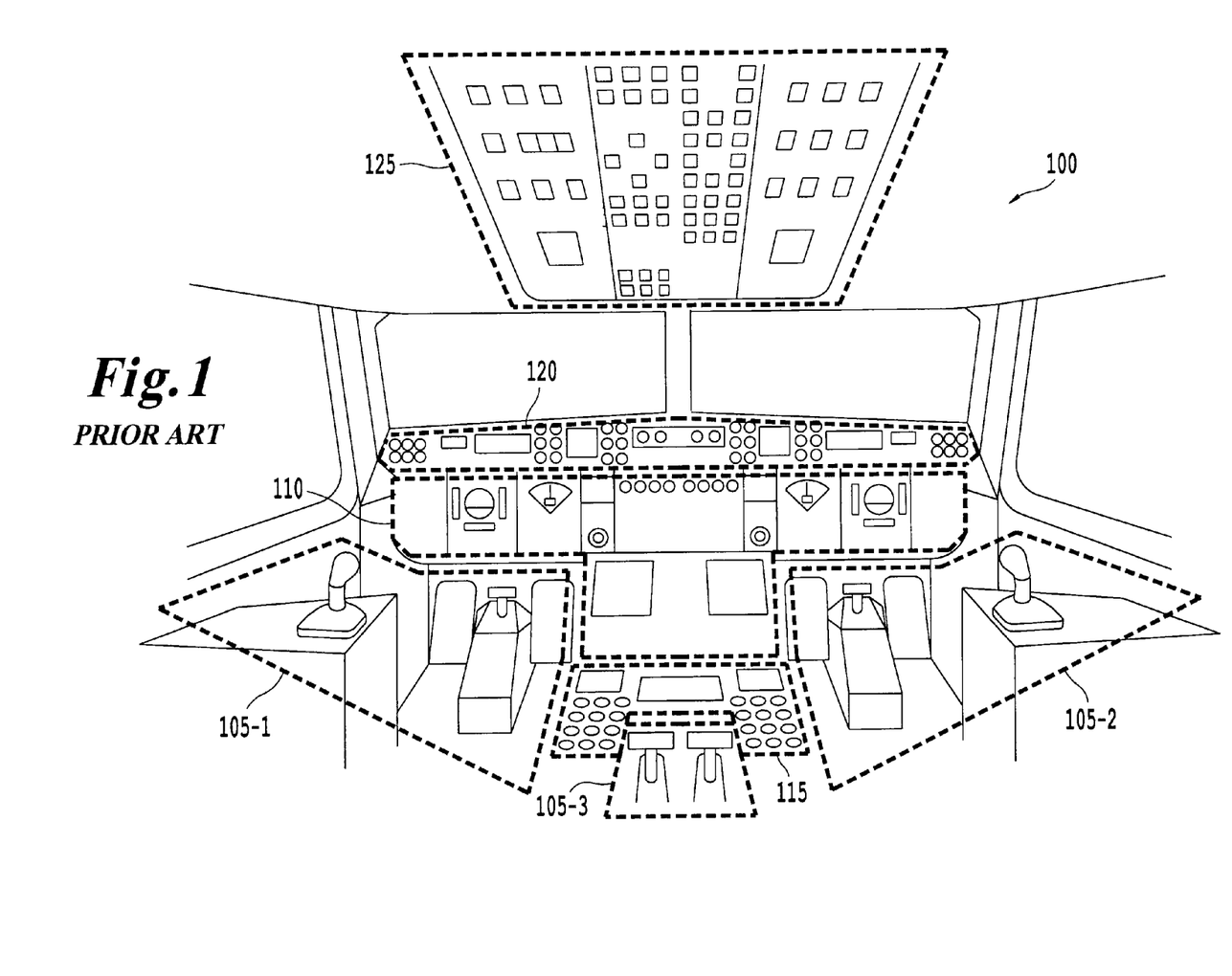
FIG. 1 is a schematic diagram of an aircraft cockpit showing the position of the control interfaces of the different systems of the aircraft.

FIG. 1 is a schematic representation of an aircraft cockpit showing the position of the control interfaces of the different systems of the aircraft.

As illustrated, cockpit interface 100 can be divided into five main zones: the flight commands of the pilot and copilot, represented by 105-1, 105-2 and 105-3, the control screens, referenced 110, the avionic interface, referenced 115 and 120, the main purpose of zone 120 being control of the automatic pilot, and the command interface of the support subsystem, referenced 125.

The flight commands referenced 105-1 to 105-3 have the purpose of controlling the main devices used to pilot an aircraft, and thus in particular of controlling yaw, pitch and roll. These commands are often mechanical or electrical.

By virtue of the complex nature of the information items input into the avionics, avionic interface 115 comprises alphanumeric input keys as well as buttons of rotary switch type for defining values.

Support subsystem command interface 125, installed in the ceiling and known as OVHP (initials for OVer Head Panel in English terminology), comprises substantially multi-position buttons, especially of the start/stop type as well as buttons of rotary switch type. These buttons are generally provided with an illumination system, for example with light shining through, by means of which an anomaly of the functionality associated with the button can be indicated. This system of signaling by illumination of buttons makes it possible to install a system management philosophy known as dark cockpit philosophy in English terminology, wherein the nominal state of a function is indicated by the dark state of its command buttons and, conversely, an abnormal state is indicated by the illuminated state of its control buttons. The application of this philosophy therefore makes it possible to identify a button quickly when a problem is detected and to view the status of all of the support subsystems.

BRIEF SUMMARY OF THE INVENTION

Although the support subsystem command interface is entirely satisfactory to the pilots, it nevertheless has certain disadvantages. In particular, because of the number of necessary buttons and the limited space suitable for accommodating them (they must be accessible to the pilot and copilot), the buttons are close to one another, and there is a non-negligible risk that the state of one button rather than another will be inadvertently modified, since all the buttons are active by nature.

The invention makes it possible to solve at least one of the problems described in the foregoing.

The object of the invention is therefore a device for control of a plurality of support subsystems in an aircraft, this device comprising the following means, filtering means capable of determining at least one command associated with at least one support subsystem of the said plurality of support subsystems according to at least one context parameter;

displaying means capable of displaying at least one representation of the said at least one determined command;

selecting means capable of selecting the said at least one representation;

activating means capable of transmitting the said at least one command to the said at least one support subsystem in response to the activation of the said at least one selected representation.

The device according to the invention therefore makes it possible to improve the support subsystem control interface and to limit the risks of error of selection of a bad command. This device also makes it possible to reduce the costs of manufacture of aircraft by reducing the cabling necessary for control of the support subsystems. Furthermore, the support subsystem control interface can be easily personalized.

Advantageously, the device additionally comprises means for detecting at least one event associated with the said aircraft, the said context parameter being determined according to the said at least one detected event. The device according to the invention therefore makes it possible to improve the reactivity of the crew as a function of detected events.

Preferably the device additionally comprises means for acquiring at least one information item, the said context parameter being determined according to at least one acquired information item. In this way the crew is able to select the support subsystem commands in simple manner.

According to a particular embodiment, the said displaying means are capable of displaying the state of the said at least one support subsystem in association with the said at least one representation. In this way the crew is able to view the state of the support subsystems whose commands can be selected.

According to another particular embodiment, the said displaying means are capable of displaying at least one block diagram in which at least one element corresponds to the said at least one representation. In this way the crew is able to view, their functional context a representation of the support subsystems whose commands can be selected, facilitating selection of commands.

According to another particular embodiment, the said activating means are capable of transmitting the said at least one command to several support subsystems of the said plurality of support subsystems in response to the activation of the said at least one selected representation. In this way the device according to the invention makes it possible to control several support subsystems with the aid of a single command in order to reduce the workload of the crew and to reduce the error risks of selection of bad commands.

Advantageously the said displaying means are capable of displaying a plurality of tasks and/or of verifications to be made, at least one indicator being associated with each of these tasks and/or verifications to indicate if the task or the corresponding verification has been completed. In this way the device according to the invention makes it possible to guide the pilot in the selection of commands.

The said displaying means are preferably capable of displaying at least one link associated with at least one task, the device additionally comprising means for directly accessing a representation of at least one command associated with the said at least one task according to the said at least one link in order to simplify the selection of commands.

Advantageously, the device additionally comprises a dedicated specific device capable of generating the said at least one command.

Another object of the invention is an aircraft comprising a device according to any one of the preceding embodiments.

BRIEF DESCRIPTION OF THE SEVERAL VIEWS OF THE DRAWING(S)

Other advantages, objectives and characteristics of the present invention will become apparent from the detailed description hereinafter, provided by way of non-limitative example, with reference to the attached drawings, wherein.

DETAILED DESCRIPTION OF THE INVENTION

The invention relates to the use of a software interface in an aircraft to control at least certain support subsystems, generally controlled by ceiling buttons, in order to permit, in particular, selective, contextual and interactive access to the commands of these support subsystems as well as automatic sequencing of a series of commands.

According to a particular embodiment, a screen is used to display the representation of accessible support subsystem commands that can be controlled via the software interface. Advantageously, the state of the support subsystems associated with these commands is displayed in connection with the representations of these commands. In this case the accessible commands are the commands which make it possible directly to modify the state of one or more support subsystems via the software interface. This interface uses, for example, a selection and activation mechanism based on a pointing system such as a mouse, a touch screen or a similar system. The software interface for command of support subsystems uses, for example, a control screen situated in zone 110 of FIG. 1, the devices making it possible to interact with the interface being situated, for example, in zone 115.

Although the software interface presented here makes it possible to replace all of the buttons installed on the ceiling, it is nevertheless possible to retain some or all of these buttons, for example, to satisfy the needs of redundancy or to offer a double interface system particularly adapted to certain emergency situations. Thus the following different implementations may be employed,

- all of the support subsystem commands are accessible via the software interface and the buttons of the ceiling;
- all of the support subsystem commands are accessible via the software interface, some also being accessible via the buttons of the ceiling;
- all of the support subsystem commands are accessible via the software interface, none being accessible via the buttons of the ceiling;
- certain support subsystem commands are accessible via the software interface, all of these commands being accessible via the buttons of the ceiling; and,
- certain support subsystem commands are accessible via the software interface, and certain commands are accessible via the buttons of the ceiling, commands possibly being accessible via the software interface and the buttons of the ceiling.

The choice of mode of accessibility to the commands may be determined in different ways. For example, this choice may be based on the frequency of use of the commands, their role relative to the safety of the aircraft or the value of their accessibility according to certain conditions, such as the detection of a fault or the phase of flight. Similarly, the nature of the command, for example the fact that the command acts on one element or on a set of elements, may be a selection criterion for accessibility to the command.

The choice of mode of accessibility to a command may also be determined according to the capacity of persons permitted to access it. For example, regulation of the cabin temperature may be permissible, within certain limits, by any crew member. Preferably, therefore, such a function should be accessible via a software interface, so that it can be controlled from the cockpit but also from the cabin.

To limit the risks of error of the pilot, copilot or crew member in selecting a bad command, it is advantageous to present a limited number of simultaneously accessible commands. Preferably, therefore, the software interface is contextualized, meaning that a filter is used to display only those commands which are potentially useful or which respond to manual or automatic selection.

The choice of simultaneously accessible commands may be defined in several ways associated with parameterization of the aircraft and/or with an instruction of the pilot, of the copilot or of a crew member. The choice of simultaneously accessible commands may be determined by the elements to which the commands relate, such as the electrical elements, the fuel-control elements or the climate-control elements, by a state of the aircraft such as the phase of flight (taxiing on the ground, takeoff, climbing, cruising, descent, landing) or by the detection of a breakdown or fault.

The simultaneously accessible commands may also be modified automatically in response to the detection of a particular state. Thus, by way of illustration, if the pilot chooses to display the commands relating to management of the electrical system, these can be automatically replaced, with or without validation by the pilot or copilot, by fuel-control commands if a fault is detected in these systems.

When the number of simultaneously accessible commands is too large to permit a coherent display thereof, they are displayed in the form of several screen pages which can be displayed successively, automatically or under control of the pilot or copilot.

Figure 2:
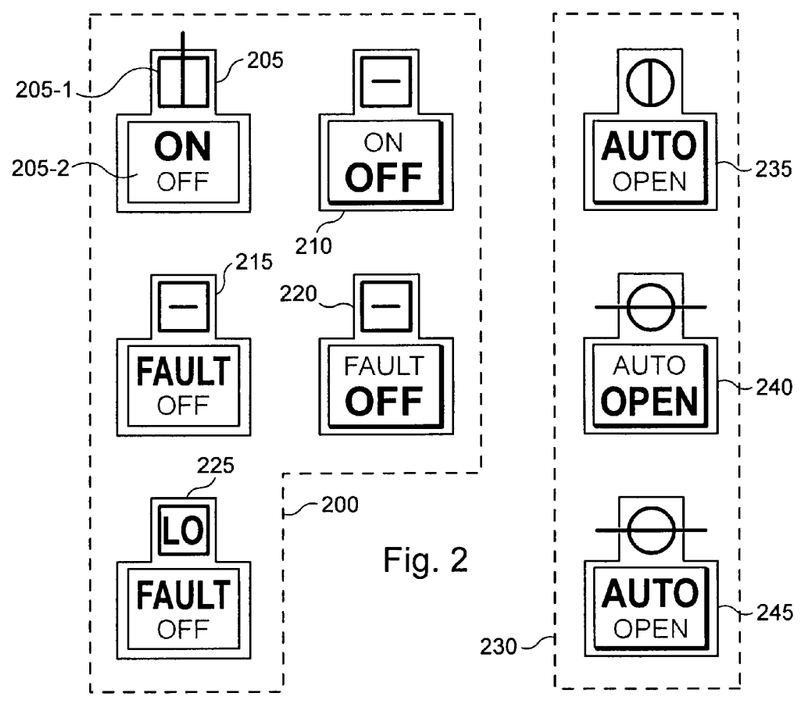
FIG. 2 illustrates two examples of representations of commands that can be used to access the associated support subsystem commands and to view their state according to the invention.

FIG. 2 illustrates two examples of representations of commands that may be used to access the commands and to view the state of the associated support subsystems.

Reference 200 relates to the representation of a command according to several states of the command and of the associated support subsystem. In the present case a pump command is considered.

Reference 205 presents the command and the state of the pump when it is activated ("on"). Virtual button 205 in this case comprises two parts, a part 205-1 in which there is shown an icon indicating the status of the support subsystem and a part 205-2 describing the state of the command as well as the status of the support subsystem in text form. The command shown here is a binary command ("on" or "off"), so it is sufficient to select representation 205 and operate an activation button to change its state. Thus, for example, representation 205 may be selected by means of a pointer such as a mouse, and the state may be changed by a click of the mouse. Other methods may be used, such as use of a touch screen making it possible to select and change the state of the command directly.

Reference 210 presents the command and the state of the pump when it is deactivated ("off"). As illustrated, the icon is modified to indicate the state of the pump, and the text is changed.

Reference 215 presents the command and the state of the pump when a fault is detected ("fault"). As illustrated, the icon is modified to indicate the deactivated state of the pump, even though the pump has not been stopped.

Reference 220 presents the command and the state of the pump when a fault is detected ("fault") but when the pump is voluntarily deactivated ("off"). As illustrated, the icon is modified to indicate the deactivated state of the pump.

Finally, reference 225 presents the command and the state of the pump when a fault is detected ("fault") but when the pump continues to operate in a degraded mode. As illustrated, the icon is modified to indicate the degraded state of the pump ("lo"). A corresponding text indication is displayed ("fault").

A color code may be associated with the representations of the commands. For example, the icons may be green if the support subsystem is operating correctly, orange if it is in a degraded mode and red if it is faulty. In this way the pilot and copilot can view the state of the represented support subsystems at a single glance.

Similarly, reference 230 relates to a representation of a command according to several states of the associated support subsystem. In this case a valve command is considered. Reference 235 represents the state of the closed valve in an automatic control mode, while reference 240 represents the state of the open valve in a manual control mode in open position, and reference 245 represents the state of the open valve in an automatic control mode.

It should be noted here that, if a command of the software interface can be used in a manner similar to that of a ceiling command to accomplish an action, a command of the software interface can also be associated with a sequence of other commands. This type of command offers numerous advantages in terms of reaction time and in terms of updating the functions of an aircraft, since a command may be modified or added at any time.

By way of illustration, one command may simultaneously control the opening and closing of a valve as well as the starting and stopping of a pump. In this case, the representation of the support subsystem indicates the state of all of the controlled support subsystems. Thus a breakdown state will be displayed if either the pump or the valve is defective.

Figure 3:
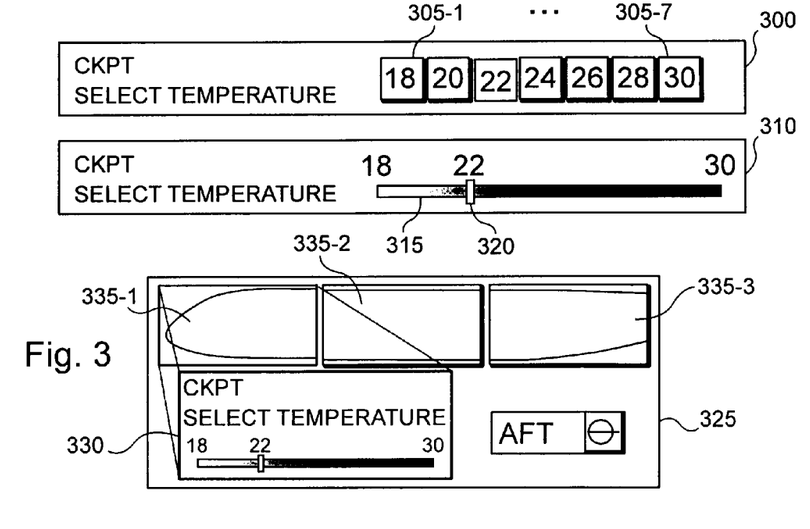
FIG. 3 illustrates an example of control of a parameter, such as the temperature, that can take on several values, via a representation of the associated command according to the invention.

FIG. 3 illustrates an example of control of a parameter, in this case the temperature, that can have several values. According to the example referenced 300, the temperature is selected with the aid of several buttons referenced 305-1 to 305-3. Alternatively, according to the example referenced 310, the temperature is selected by moving a cursor 320 along a graduated bar 315.

The selection of the temperature may be coupled with a zone selection mechanism as illustrated by reference 325. According to this example, a temperature selection mechanism 330, such as mechanism 300 or mechanism 310, is associated with several buttons referenced 335-1 to 335-3, which permit a zone of the aircraft to be selected. The temperature regulated by means of mechanism 330 corresponds to the activated zone or zones.

Figure 4:
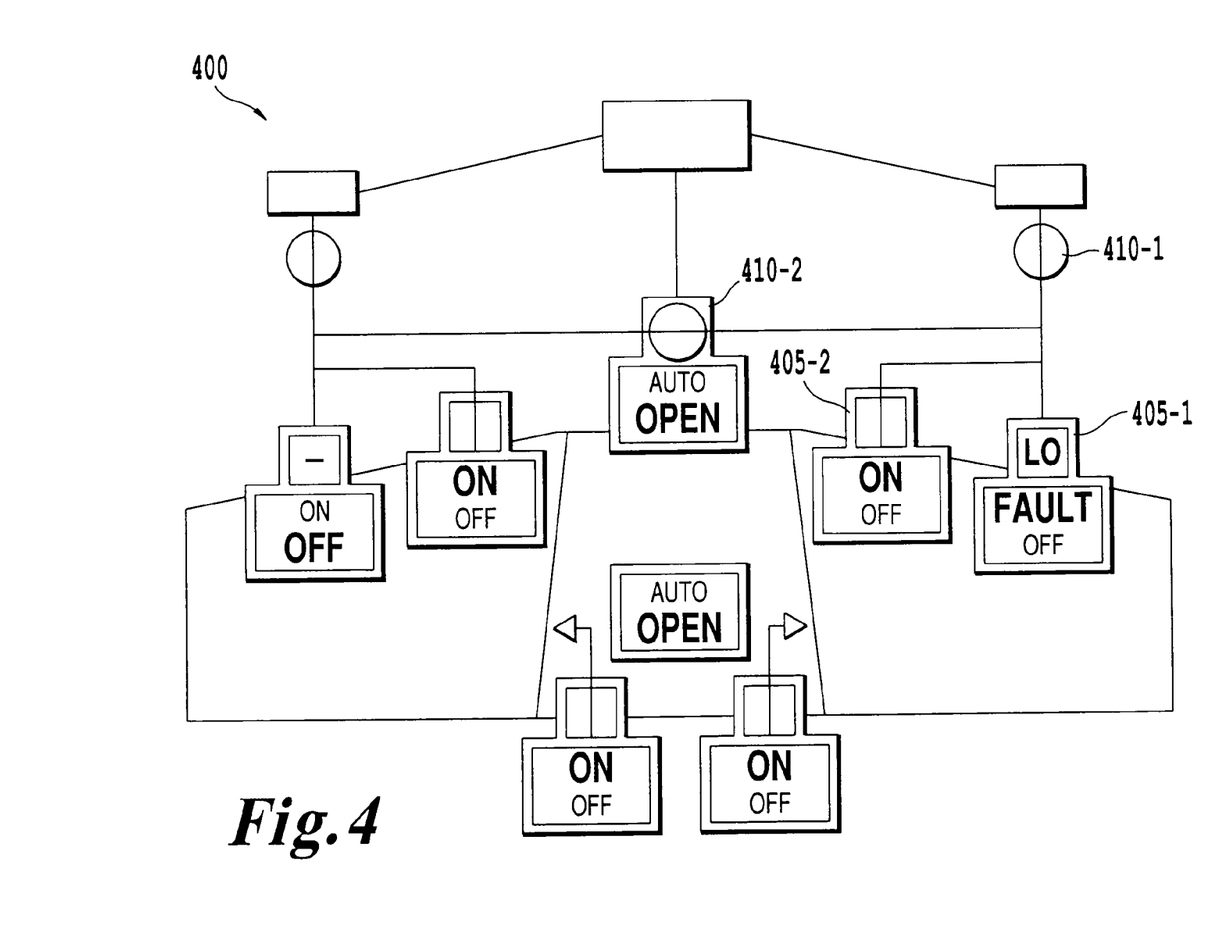
FIG. 4 represents a block diagram comprising representations of commands such as those illustrated in FIGS. 2 and 3, these representations being capable of being used to access the commands.

Advantageously, the commands illustrated in FIGS. 2 and 3 are integrated into block diagrams such as that shown in FIG. 4, in order to make it possible to view the controlled support subsystem in the system.

The diagram illustrated here concerns a fuel-management system referenced generically by 400. This diagram makes it possible to view the relationships between the different commands as well as their effects. For example, it is easy to see that commands 405-1 and 405-2 address redundant system elements and that pump 405-1, functioning in degraded mode, is backed up by pump 405-2 to convey the fuel to open valves 410-1 and 410-2.

According to a particular embodiment, the granularity of block diagrams is variable. Thus each command shown may relate to one element or a to a set of elements. The displayed state then represents the state of one element or of a set of elements. Depending on the parameters used, the selection of a command makes it possible to modify the state of the command or to access the different elements controlled by the command.

Figure 5:
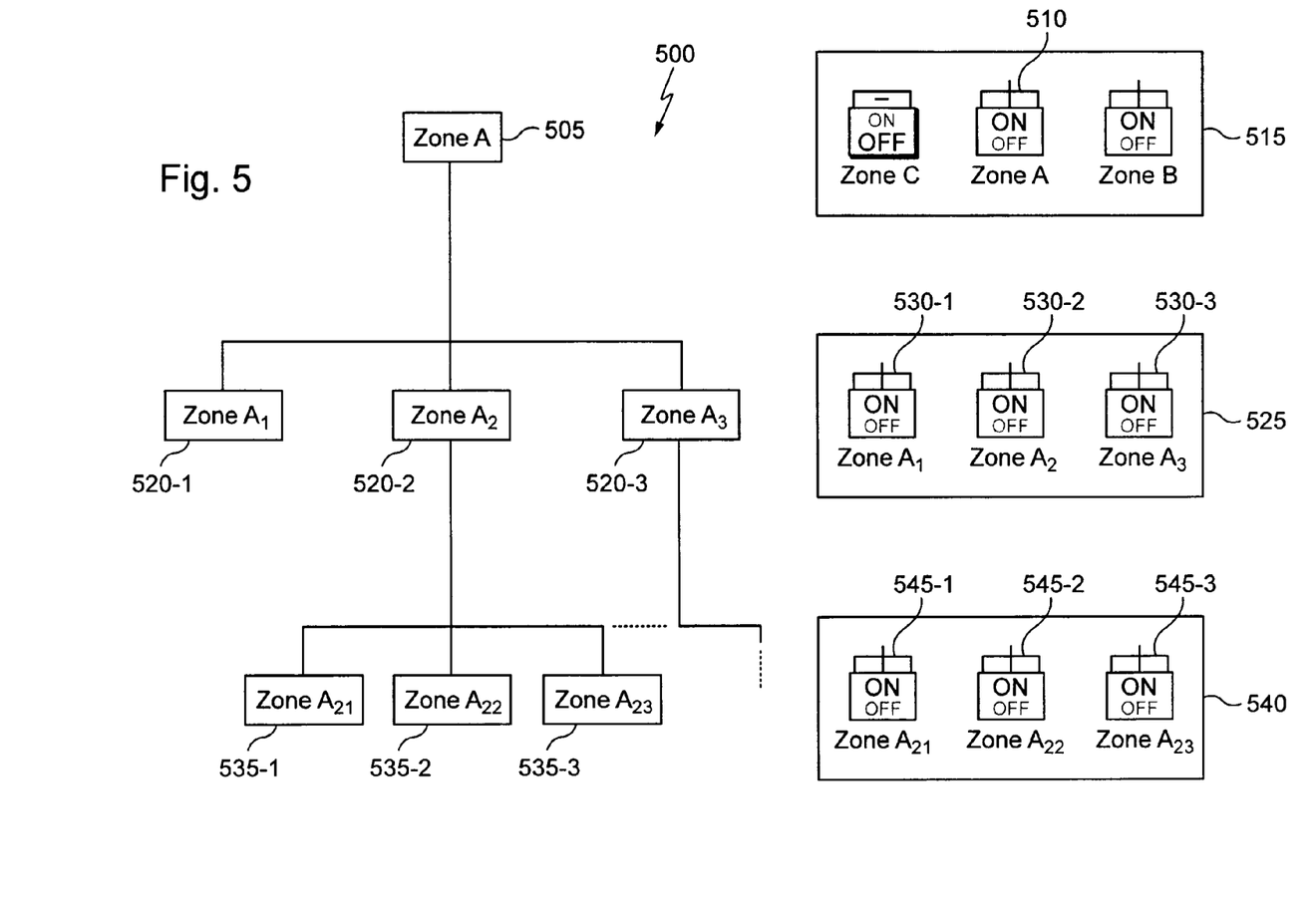
FIG. 5 illustrates the use of a command tree to control the electrical power supply of several sectors of an aircraft according to a variable granularity.

FIG. 5 illustrates the use of such a command tree to control the electrical power supply of several sectors of an aircraft. The left part of the figure illustrates the command tree, while the right part illustrates the graphical page that can be displayed to access the representations of the commands. As illustrated, command tree 500 comprises a root representing a first command capable of activating or deactivating the electrical power supply of a sector A referenced 505 via a button 510 displayed on a page 515 that may comprise other buttons, such as buttons to control sectors B and C. As indicated in the foregoing, each button advantageously comprises a representation of the state of the associated support subsystem. Similarly, each button preferably comprises a reference with which it can be identified. In this case button 510 comprises the reference "Zone A", the indication "ON" and an icon illustrating that no anomaly is detected.

Tree 500 comprises a second level in making it possible to control several subsets of sector A, such as sectors $A_1$, $A_2$ and $A_3$, referenced 520-1 to 520-3 respectively. The display corresponding to this level of the tree is represented on page 525, comprising buttons 530-1 to 530-3 making it possible to activate or deactivate the electrical power supply of sectors $A_1$, $A_2$ and $A_3$, respectively.

Similarly, tree 500 in this case comprises a third level, making it possible to control several subsets of certain sectors of the second level. According to this example, the third level makes it possible to control several subsets of sectors $A_2$ and $A_3$ but not of sector $A_1$. By way of illustration, sectors $A_{21}$, $A_{22}$ and $A_{23}$ of sector $A_2$ can be controlled independently. The display corresponding to this branch of the third level of tree 500 is represented on page 540 comprising buttons 545-1 to 545-3 making it possible to activate or deactivate the electrical power supply of sectors $A_{21}$, $A_{22}$ and $A_{23}$, respectively.

Thus, when button 510 is selected, it is possible according to a first command to access the subsets represented by this button, or in other words page 525 in this case. Similarly, when a button of screen 525 is selected, it is possible according to a first command to access the subsets represented by this button, or in other words page 540, for example.

A second command makes it possible to activate or deactivate all of the elements associated with a button. For example, if button 510 is selected, this second command makes it possible to activate or deactivate the electrical power supply of all sectors belonging to sector A.

The first and second commands can be controlled by physical buttons, such as the left and right buttons of a mouse, or by logical buttons displayed on the screen pages.

In a manner similar to the use of block diagrams, it is possible to control the commands via a text interface that uses, for example, hypertext links to navigate from one document to another, from one part of a document to another, or to select the representation of a command or the representations of several commands. This approach makes it possible to provide a decision aid to the pilot or copilot.

Figure 6:
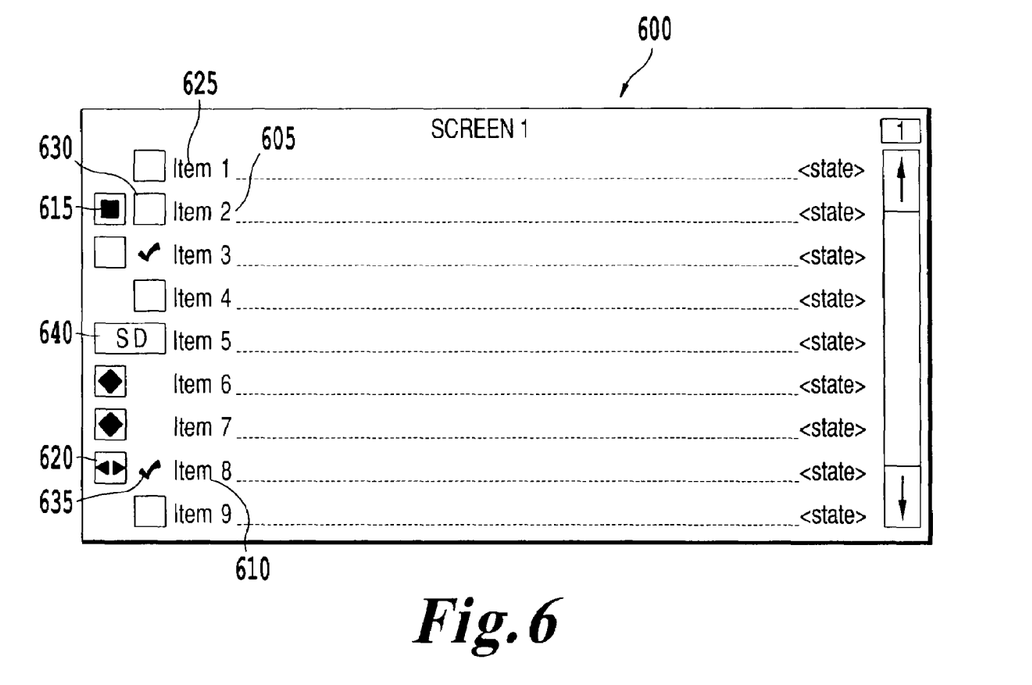
FIG. 6 illustrates an example of a screen page of the software interface, making it possible to access the support subsystem commands, to guide the proper application of a procedure to be applied following an anomaly, to verify that certain tasks indeed have been performed and/or to acquire information items that may be used for maintenance and diagnostic operations.

It is also possible to use a text interface to reach block diagrams making it possible to control the support subsystems, as illustrated in FIG. 6.

This interface may also be used to acquire information items making it possible to contextualize access to the support system control commands, in order to store such information items in memory for use in diagnostic and/or maintenance operations and to permit the pilot or copilot to control the execution of certain operations according to a list of tasks to be performed.

The contextualization of screens for access to representations of commands is advantageously associated with a diagnostic module for proposing, to the pilot or copilot, access to commands that may be useful.

Text interface 600 makes it possible in particular to select groups of commands or of block diagrams by using links associated with the presented lines and to guide the pilot or copilot in configuring the support subsystems. Each line in this case represents one or more tasks and/or verifications to be performed or one or more functions.

Interface 600 such as represented contains two rows of indicators, situated on the left of the screen, each indicator being associated with one line. The first column indicates the presence or absence of a link. In other words, when a square is represented in the first column, it means that a link is associated with the line. When this square contains arrows, the link makes it possible to reach a group of commands, for example in the form of a block diagram. The second column provides an indication relating to execution of the action corresponding to the line. This indication may be automatically updated if the action has been commanded via the software interface or manually if the action has been commanded via a ceiling button.

Thus, for example, lines 605 and 610 comprise indicators 615 and 620 in the first column, showing that they are associated with a link, whereas line 625 does not have any link. It will be noted in addition that indicator 620 contains arrows indicating that it is possible, from this indicator, to reach representations of commands relating to the function defined by line 610. Similarly, it should be noted that indicator 630 shows that the action associated with line 605 has not been executed, while indicator 635 shows that the action associated with line 610 has been effected. Indicator 640 relates to a link that makes it possible to reach representations of commands accessible via software interface 600, execution of which can be indicated by a particular color (the initials SD, which stand for System Display in English terminology, indicate here that the corresponding command or commands is or are accessible via the software interface).

Furthermore, the interface presented in FIG. 6 comprises, on the right part of the screen, scroll arrows with which the text situated above or below the displayed text can be viewed.

Naturally, other types of indicators may be used.

The representation illustrated in FIG. 6 may in particular represent a control page that can be displayed when an event or a fault is detected. For example such a page can be displayed following detection of smoke. It then takes on the form of a list of tasks or verifications to be performed.

As described in the foregoing, the support subsystem control interface comprises several pages, which in particular can be presented in text form or in the form of block diagrams. The composition of these pages can be predetermined and stored in memory in a database. This composition may also be determined dynamically according to the selections of the pilot or copilot and/or according to the detected events.

According to a particular embodiment, the pages that are to be displayed are determined according to a mechanism of links such as described in the foregoing and according to the detected events, such as a fault, a correspondence table being established between the detected events and the pages that are to be displayed.

Advantageously, the detection of a fault leads to the display of the page containing the representations of commands corresponding to this fault, as a function of the predetermined correspondence table.

A priority mechanism may be employed. Thus, if a fault that does not have an important consequence is detected, a simple alert may be generated, the page comprising the representations of the corresponding commands being displayed only after acceptance by the pilot or copilot. For a fault having direct consequences for the safety of the aircraft, the page comprising the representations of the corresponding commands is displayed directly, to permit the pilot or copilot to take the necessary actions rapidly.

Figure 7:
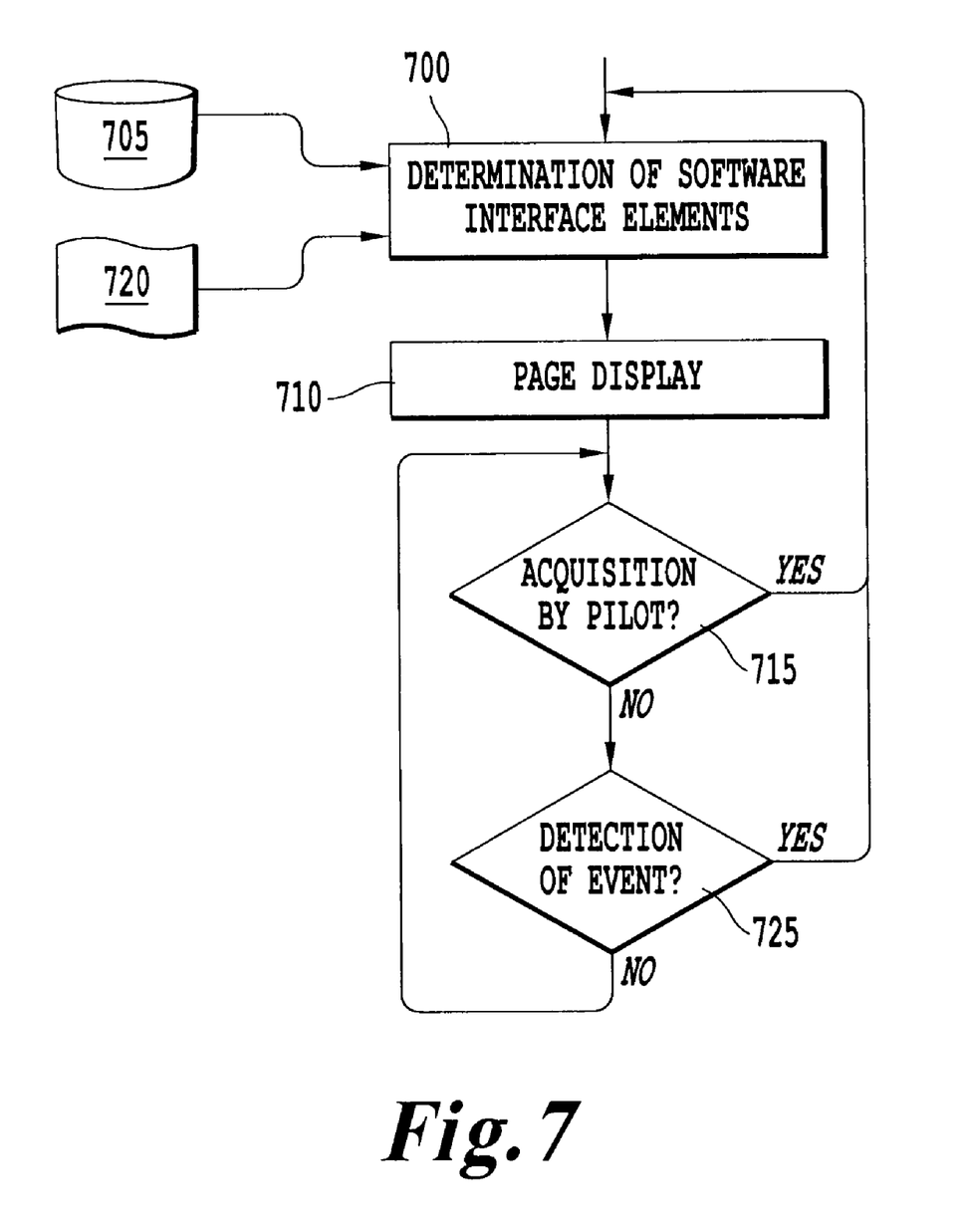
FIG. 7 schematically illustrates an example of an algorithm for selecting support subsystem commands that are directly accessible via the software interface.

FIG. 7 illustrates an example of algorithms employed to control those elements of the software interface making it possible to access commands for control of the support subsystems.

A step 700 has the purpose of determining the elements of the software interface that are to be displayed, or in other words determining the commands for which a representation is to be displayed. As described in the foregoing, this determination may be achieved according to the inputs of the pilot or copilot or according to detected events. By default, elements for accessing the different block diagrams are displayed in text or graphical form. These elements are, for example, stored in memory in a database 705 in the form of predetermined screen pages.

After they have been determined, these elements are displayed (step 710) in the form of a page.

A test is then performed to determine whether the pilot or copilot has selected an object of the displayed page or has acquired a datum linked to the software interface (step 715). If the pilot or copilot has selected an object of the displayed page or has acquired a datum linked to the software interface, a new determination of elements of the software interface that is to be displayed is performed (step 700) taking the selection or acquisition into account.

Advantageously, the screen pages are organized hierarchically to permit navigation from one to the other according to the inputs of the pilot or copilot, to detected events or to particular configurations. The structure of the hierarchy is, for example, stored in memory in file 720, which can be stored in memory in database 705 or in another storage zone. Thus the selection or acquisition performed by the pilot or copilot makes it possible to select, in database 705, the page being sought according to the structure determined in file 720.

The determined elements are displayed (step 710) and the process is continued.

If no object of the displayed page has been selected and if no acquisition has been made, another test is performed to determine if an event has been detected (step 725). In this case an event is a fault, a change of configuration, a change of state or more generally any change that can be detected, preferably automatically.

If no event has been detected, the last two steps (715 and 725) are repeated while waiting for an intervention by the pilot or copilot or for the detection of an event.

On the other hand, if an event is detected, a new determination of the elements of the software interface that are to be displayed is performed (step 700) taking the detected event into account and using, for example, the hierarchical structure of file 720 or a predetermined correspondence table. The determined elements are displayed (step 710) and the process is continued.

Figure 8:
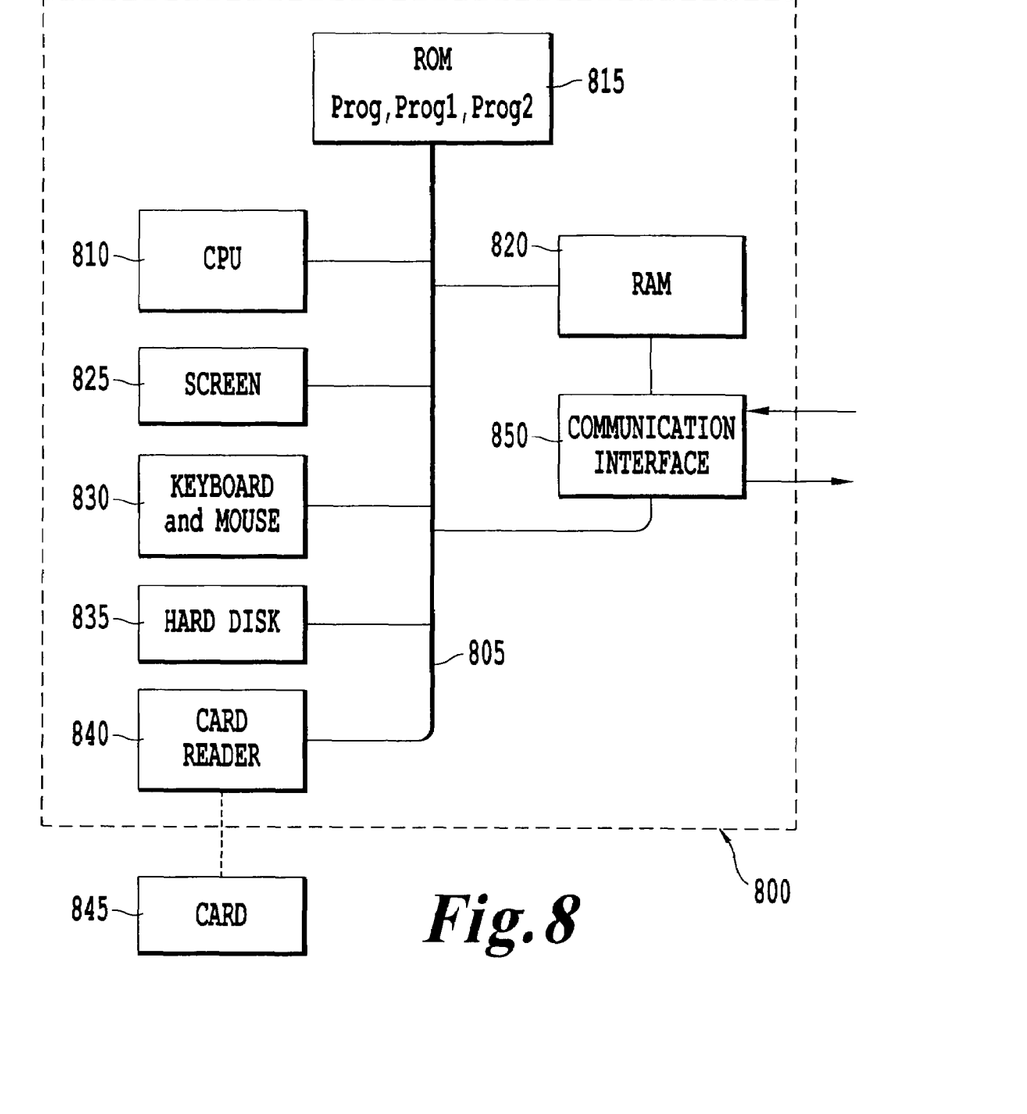
FIG. 8 illustrates an example of a physical architecture adapted for employment of the invention.

FIG. 8 illustrates an example of physical architecture adapted to employ the invention. In this case device 800 is provided with a communication bus 805, to which there are connected:

- a central processing unit or microprocessor 810 (CPU, abbreviation for Central Processing Unit in English terminology);
- a read-only memory 815 (ROM, acronym for Read Only Memory in English terminology), that can comprise the programs necessary for implementation of the invention;
- a random access memory or cache memory 820 (RAM, acronym for Random Access Memory in English terminology), comprising registers capable of recording the variables and parameters created and modified in the course of execution of the aforesaid programs; and,
- a communication interface 850, capable of transmitting and receiving data, especially to and from the support subsystems in order to control and know their state.

Preferably, device 800 also has the following elements:

- a screen 825, for visualizing data such as representations of commands and for acting as a graphical interface with the user, who will be able to interact with the programs according to the invention, with the aid of a keyboard and of a mouse 830, or of another pointing device such as a touch screen or a remote control;
- a hard disk 835, that can comprise the aforesaid programs and data processed or to be processed according to the invention; and
- a memory card reader 840 adapted to receive a memory card 845 and to read or write therein data processed or to be processed according to the invention.

The communication bus permits communication and interoperability among the different elements included in device 800 or connected thereto. The depiction of the bus is not limitative and, in particular, the central unit is capable of communicating instructions to any element of device 800 directly or via another element of device 800.

The executable code of each program permitting the programmable device to employ the processes according to the invention may be stored, for example, on hard disk 835 or in read-only memory 815.

According to one variant, memory card 845 may contain data, especially a table of correspondence between the detected events and the commands that may be requested, as well as the executable code of the aforesaid programs which, once read by device 800 is stored on hard disk 835.

According to another variant, it will be possible for the executable code of the programs to be received at least partly via interface 850 to be stored in a manner identical to that described in the foregoing.

More generally, it will be possible for the program or programs to be loaded into one of the storage means of device 800 before being executed.

Central unit 810 will command and direct the execution of the instructions or portions of software code of the program or programs according to the invention, which instructions are stored on hard disk 835 or in read-only memory 815 or else in the other aforesaid storage elements. During boot-up, the program or programs that is or are stored in a non-volatile memory, such as hard disk 835 or read-only memory 815, are transferred to random-access memory 820, which then contains the executable code of the program or programs according to the invention as well as registers for storing in memory the variables and parameters necessary for implementation of the invention.

Naturally, to satisfy specific needs, the individual competent in the field of the invention will be able to apply modifications in the foregoing description.

The invention claimed is:

1. A device for control of a plurality of support subsystems in an aircraft, the device comprising:
    a filtering unit configured to determine at least one command associated with at least one support subsystem of the plurality of support subsystems according to at least one context parameter, the at least one support subsystem relating to at least one of a generation and a distribution of an electrical capacity, a generation and a distribution of a hydraulic capacity, a generation of a pneumatic capacity, air conditioning and a pressurization, a fuel management and an auxiliary power engine;
    a display unit that displays at least one representation of the at least one determined command, the at least one representation of the at least one determined command comprising an indication relating to a state of the at least one support subsystem controlled by the at least one determined command;
    a selection unit that selects the at least one representation, wherein the selection unit employs a predetermined hierarchical structure to control the at least one support subsystem,
    when the at least one representation is selected, a first command accesses a plurality of representations of commands of a lower level of the predetermined hierarchical structure, and
    if the at least one representation is selected, a second command activates or deactivates all of the commands of the lower level of the predetermined hierarchical structure; and
    an activation unit that transmits the at least one determined command to the at least one support subsystem in response to an activation of the at least one selected representation.

2. The device according to claim 1, additionally comprising:
    a detection unit that detects at least one event associated with the aircraft, the at least one context parameter being determined according to the at least one detected event.

3. The device according to claim 1, additionally comprising:
    an acquisition unit that acquires at least one information item, the at least one context parameter being determined according to at least one acquired information item.

4. The device according to claim 1, according to which the display unit displays at least one block diagram at least one element of which corresponds to the at least one representation.

5. The device according to claim 1, according to which the activation unit transmits the at least one command to several support subsystems of the plurality of support subsystems in response to the activation of the at least one selected representation.

6. The device according to claim 1, according to which the display unit displays a plurality of tasks and/or of verifications to be made, at least one indicator being associated with each of the tasks and/or verifications to indicate if the task or the corresponding verification has been completed.

7. The device according to claim 6, according to which the display unit displays at least one link associated with at least one task,
    the device additionally comprising:
        an access unit that directly accesses a representation of at least one command associated with the at least one task according to the at least one link.

8. The device according to claim 1, additionally comprising:
    a dedicated device capable of generating the at least one command.

9. An aircraft comprising the device according to any one of the preceding claims.

* * * * *